(12) United States Patent
Yang et al.

(10) Patent No.: US 7,974,108 B2
(45) Date of Patent: *Jul. 5, 2011

(54) SYNCHRONOUS RECTIFYING CIRCUIT FOR OFFLINE POWER CONVERTER

(75) Inventors: Ta-yung Yang, Milpitas, CA (US); Tso-Min Chen, Taichung (TW)

(73) Assignee: System General Corp., Taipei Hsien (TW)

( * ) Notice: Subject to any disclaimer, the term of this patent is extended or adjusted under 35 U.S.C. 154(b) by 848 days.

This patent is subject to a terminal disclaimer.

(21) Appl. No.: 11/927,619

(22) Filed: Oct. 29, 2007

(65) Prior Publication Data
US 2009/0110129 A1 Apr. 30, 2009

(51) Int. Cl.
*H02M 3/335* (2006.01)
*H02M 5/42* (2006.01)

(52) U.S. Cl. ...................... 363/21.06; 363/89
(58) Field of Classification Search .............. 363/15, 363/21.06, 21.14, 25, 89, 127
See application file for complete search history.

(56) References Cited

U.S. PATENT DOCUMENTS

| 6,671,193 | B1 | 12/2003 | Pelkonen |
| 6,940,738 | B2 | 9/2005 | Huang et al. |
| 7,173,835 | B1 | 2/2007 | Yang |
| 7,701,733 | B2 * | 4/2010 | Yang et al. ............... 363/21.06 |
| 7,701,736 | B2 * | 4/2010 | Yang et al. ............... 363/89 |
| 7,787,264 | B2 * | 8/2010 | Yang et al. ............... 363/21.06 |
| 7,885,084 | B2 * | 2/2011 | Yang et al. ............... 363/21.01 |
| 7,911,813 | B2 * | 3/2011 | Yang et al. ............... 363/21.06 |

FOREIGN PATENT DOCUMENTS

| CN | 101106333 | 1/2008 |
| JP | 2001-069756 | 3/2001 |

OTHER PUBLICATIONS

"1st Office Action of China counterpart application", issued on Dec. 25, 2009, p. 1-p. 11.

* cited by examiner

*Primary Examiner* — Jessica Han
(74) *Attorney, Agent, or Firm* — Jianq Chyun IP Office

(57) ABSTRACT

A synchronous rectifying circuit is provided for power converter. An integrated synchronous rectifier has a rectifying terminal, a ground terminal a first input terminal and a second input terminal. The rectifying terminal is coupled to secondary side of a transformer. The ground terminal coupled to output of the power converter. A power transistor is connected between the rectifying terminal and the ground terminal. The first input terminal and the second input terminal are coupled to receive a pulse signal for turning on/off the power transistor. A pulse-signal generation circuit includes an input terminal coupled to receive the switching signal for switching the transformer of the power converter. A first output terminal and a second output terminal of the pulse-signal generation circuit generate the pulse signal. An isolation device is coupled between the first input terminal and the second input terminal, and the first output terminal and the second output terminal.

25 Claims, 6 Drawing Sheets

SYNCHRONOUS RECTIFYING CIRCUIT FOR OFFLINE POWER CONVERTER

BACKGROUND OF THE INVENTION

1. Filed of the Invention

The present invention relates in general to a control circuit of power converter, and more particularly, to synchronous rectifying control circuit for a power converter.

2. Description of Related Art

An offline power converter includes a power transformer to provide isolation from an AC line input to the output of the power converter for safety. In recent development, applying a synchronous rectifier on a secondary side of the power transformer is to achieve a high efficiency conversion for power converters, such as "Control circuit associated with saturable inductor operated as synchronous rectifier forward power converter" by Yang, U.S. Pat. No. 7,173,835. However, the disadvantage of this prior art is an additional power consumptions caused by saturable inductors and/or current-sense devices. The saturable inductor and the current-sense device are needed to facilitate the synchronous rectifier operated in both continuous mode and discontinuous mode operations.

SUMMARY OF THE INVENTION

The present invention provides a synchronous rectifying circuit for a power converter, which can achieve higher conversion efficiency. Besides, no current sense device and saturable inductor are required for both continuous mode and discontinuous mode operations.

A synchronous rectifying circuit is developed to improve the efficiency of the power converter. The synchronous rectifying circuit includes a pulse-signal generation circuit for generating a pulse signal in response to the rising edge and the falling edge of a switching signal. The switching signal is utilized to switch a transformer and regulate the power converter. An isolation device, such as a pulse transformer or capacitors, is coupled to the pulse-signal generation circuit to transfer the pulse signal from the primary side of the transformer to the secondary side of the transformer. An integrated synchronous rectifier has a rectifying terminal, a ground terminal, a first input terminal and a second input terminal. The rectifying terminal is coupled to the secondary side of a transformer. The ground terminal is coupled to the output of the power converter. A power transistor is connected in between the rectifying terminal and the ground terminal. The first input terminal and the second input terminal are coupled to receive the pulse signal for turning on/off the power transistor. The pulse signal is a trig signal. The pulse width of the pulse signal is shorter than the pulse width of the switching signal.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
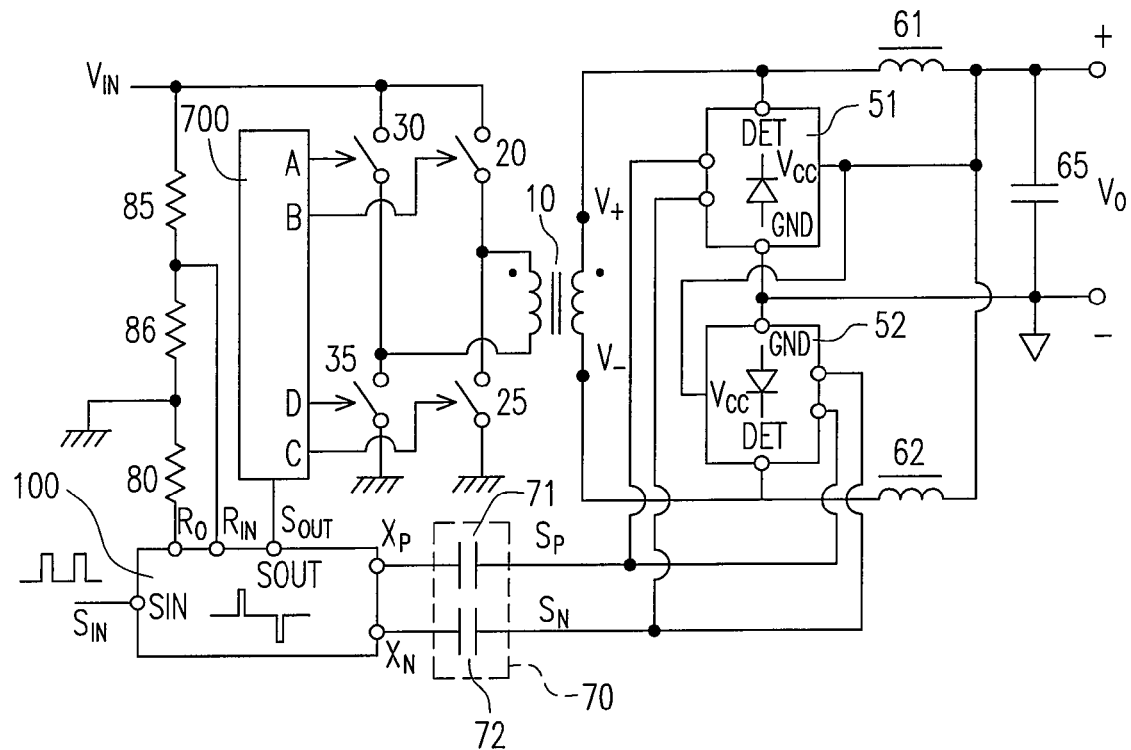
FIG. 1 shows an embodiment of an offline power converter with synchronous rectifier according to the present invention.

FIG. 1 shows a preferred embodiment of a full bridge zero-voltage-switching (ZVS) phase shift power converter with synchronous rectifiers of the invention. The synchronous rectifiers are operated as current doubler rectifiers. The detail skill of the full bridge power converter with current doubler rectifiers can be found in "A full bridge soft switched telecom power supply with a current doubler rectifier" by Nasser H. Kutkut, IEEE Telecommunications Energy Conference, 1997, INTELEC. 97, pages: 344-351, all disclosures of which are incorporated herewith by reference. The power converter includes a transformer 10 having a primary side and a secondary side. The primary side of the transformer 10 comprises four power switches 20, 25, 30 and 35 for switching the transformer 10. The secondary side includes a first terminal V+ and a second terminal V−. A switching voltage is produced across the second terminal V− and the first terminal V+ in response to the switching of the transformer 10. A first integrated synchronous rectifier 51 comprises a rectifying terminal DET connected to the first terminal V+. A ground terminal GND of the first integrated synchronous rectifier 51 is connected to the ground of the power converter. A second integrated synchronous rectifier 52 having a rectifying terminal DET and the ground terminal GND is also connected from the second terminal V− to the ground of the power converter, as shown. An inductor 61 is connected from the first terminal V+ to the output VO of the power converter. Another inductor 62 is connected from the second terminal V− to the output terminal VO of the power converter. The first integrated synchronous rectifier 51 and the second integrated synchronous rectifier 52 are connected to operate as a current doubler. A first input terminal $S_P$, a second input terminal $S_N$ of the first integrated synchronous rectifier 51 and the second integrated synchronous rectifier 52 are connected to the secondary side of an isolation device 70 to receive a pulse signal for turning on or turning off the integrated synchronous rectifiers 51 and 52. The isolation device 70 can be composed of, for example, capacitors 71 and 72, in one embodiment, or a pulse transformer. The capacitance of capacitors 71 and 72 can be small, such as 20 pF, but high-voltage rating of capacitors is required for the isolation.

A pulse-signal generation circuit 100 comprises an input signal terminal SIN coupled to receive a switching signal $S_{IN}$ for generating the pulse signal in response to the rising (leading) edge and the falling (trailing) edge of the switching signal $S_{IN}$. The switching signal $S_{IN}$ is developed to switch the transformer 10 and regulate the power converter. The pulse signal is produced on a first output terminal $X_P$ and a second output terminal $X_N$ of the pulse-signal generation circuit 100. The pulse signal is a differential signal. The polarity of the pulse signal determines turning on or turning off of the integrated synchronous rectifiers 51 and 52. In order to produce the pulse signal before the transformer 10 is switched, the pulse-signal generation circuit 100 further generates a drive signal $S_{OUT}$ at the output terminal SOUT in response to the switching signal $S_{IN}$. The drive signal $S_{OUT}$ is coupled to control power switches 20, 25, 30 and 35 through a full-bridge drive circuit 700. A time delay is developed between the enable of the switching signal $S_{IN}$ and the enable of the drive signal $S_{OUT}$.

The first output terminal $X_P$ and the second output terminal $X_N$ of the pulse-signal generation circuit 100 are coupled to the isolation device 70 to transfer the pulse signal from the primary side to the secondary side of the transformer 10. The pulse width of the pulse signal is shorter than the pulse width of the switching signal $S_{IN}$. The pulse signal is a trig signal that includes high frequency elements. Therefore, only small capacitors or a small pulse transformer is required for the isolation device 70, which reduces the space utilization on the print circuit board (PCB) and reduce the cost of the power converter. The pulse-signal generation circuit 100 further includes an input voltage terminal $R_{IN}$ coupled to receive an input voltage signal representative of an input voltage $V_{IN}$ of the transformer 10. The input voltage terminal $R_{IN}$ is coupled to the input voltage $V_{IN}$ via resistors 85 and 86. A program terminal $R_O$ of the pulse-signal generation circuit 100 is coupled to generate a program signal through a resistor 80. When the power converter is operated in the discontinuous mode during the light load, the pulse-signal generation circuit 100 can thus produce an additional pulse signal to turn off the integrated synchronous rectifier 51 and 52 in accordance with the input voltage signal, the program signal and the pulse width of the switching signal $S_{IN}$.

Figure 2:
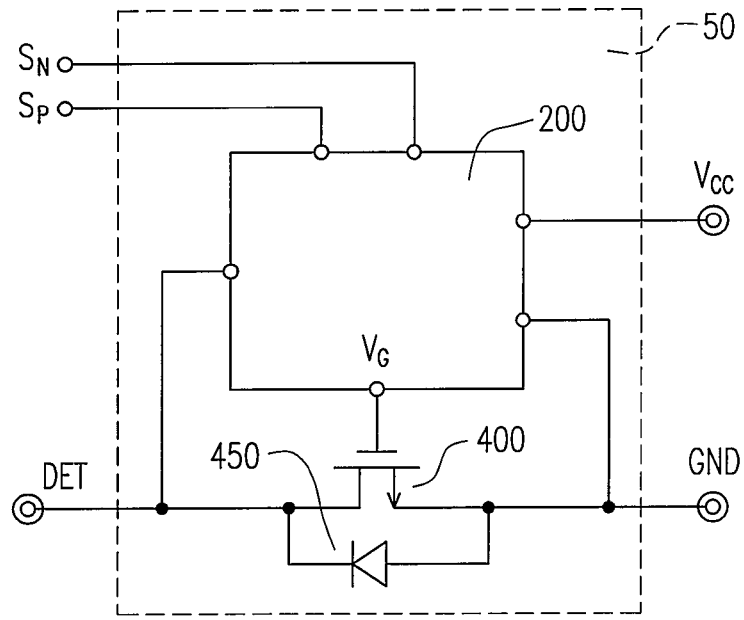
FIG. 2 is a schematic diagram of an integrated synchronous rectifier according to an embodiment of the present invention.

FIG. 2 is a schematic diagram of an integrated synchronous rectifier of an embodiment of the present invention. The integrated synchronous rectifier 50 represents the circuit of one of the integrated synchronous rectifiers 51 and 52, as shown in FIG. 1. The integrated synchronous rectifier 50 includes a power transistor 400, a diode 450 and a control circuit 200. The diode 450 is connected to the power transistor 400 in parallel. The power transistor 400 is connected in between the rectifying terminal DET and the ground terminal GND. The rectifying terminal DET is coupled to the secondary side of the transformer 10 in FIG. 1. The ground terminal GND is coupled to the output of the power converter. The control circuit 200 is coupled to receive the pulse signal via the first input terminal $S_P$ and the second input terminal $S_N$ for turning on or turning off the power transistor 400. A $V_{CC}$ terminal is utilized to supply the power source to the control circuit 200.

Figure 3:
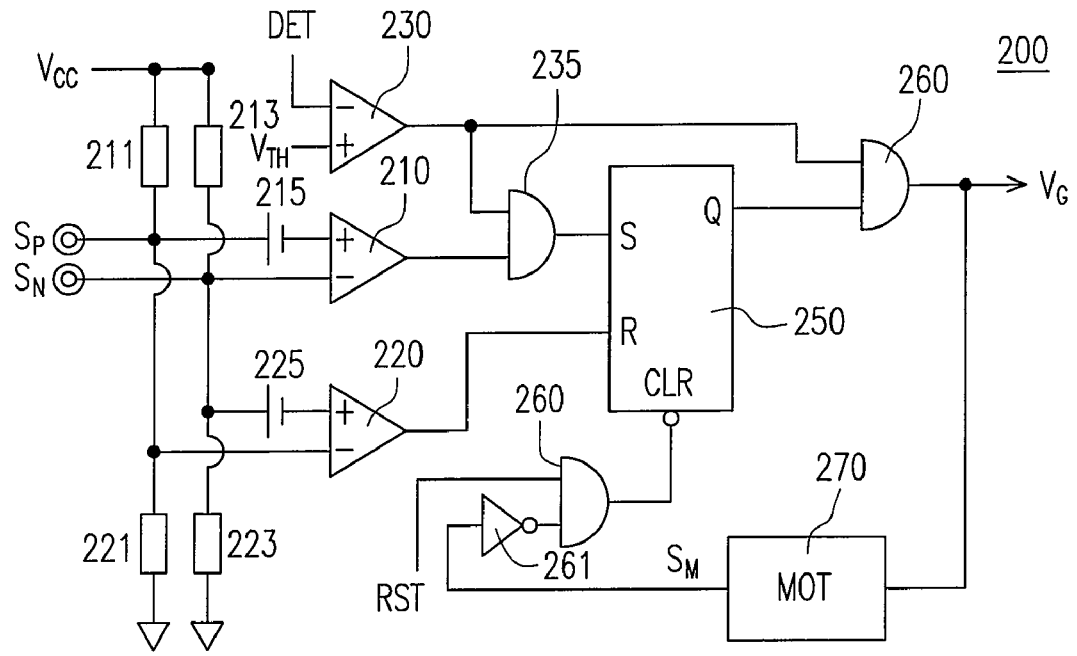
FIG. 3 is an embodiment of a control circuit of the integrated synchronous rectifier according to the present invention.

FIG. 3 shows a schematic diagram of an embodiment of the control circuit 200 of FIG. 2. Resistors 211 and 221 provide a bias termination for the first input terminal $S_P$. Resistors 213 and 223 provide another bias termination for the second input terminal $S_N$. The first input terminal $S_P$ is coupled to the positive input of a comparator 210 and the negative input of a comparator 220. The second input terminal $S_N$ is coupled to the positive input of a comparator 220 and the negative input of a comparator 210. Offset voltages 215 and 225 are respectively disposed in the positive inputs of the comparators 210 and 220 for producing hysteresis in one embodiment. A third comparator 230 has a threshold voltage $V_{TH}$ connecting to its positive input. The negative input of the comparator 230 is coupled to the rectifying terminal DET. The outputs of comparators 210 and 230 are coupled to the set input terminal ("S" as shown) of a SR flip-flop 250 through an AND gate 235. The reset input terminal ("R" as shown) of the SR flip-flop 250 is controlled by the output of the comparator 220. The output of the SR flip-flop 250 and the output of the comparator 230 are connected to an AND gate 260. A gate-drive signal $V_G$ is generated at the output of the AND gate 260 for controlling the status of being turning on or turning off of the power transistor 400 of FIG. 2. The maximum on time of the gate-drive signal $V_G$ is limited by a maximum-on-time circuit (MOT) 270. The gate-drive signal $V_G$ is connected to the maximum-on-time circuit 270. After a blanking time, a maximum-on-time signal $S_M$ will be produced in response to the enable of the gate-drive signal $V_G$. The maximum-on-time signal $S_M$ is connected to an AND gate 260 via an inverter 261. Another input of the AND gate 260 is connected to a power-on reset signal RST. The output of the AND gate 260 is coupled to clear (reset) the SR flip-flop 250. The maximum on time of the gate-drive signal $V_G$ is thus limited by the blanking time of the maximum-on-time circuit 270. The gate-drive signal $V_G$ will turn off the power transistor 400 once the pulse signal is generated as, $$V_{SN} - V_{SP} > V_{225} \qquad (1)$$

The gate-drive signal $V_G$ will turn on the power transistor 400 when equations (2) and (3) are met, $$V_{SP} - V_{SN} > V_{215} \qquad (2)$$

$$V_{DET} < V_{TH} \qquad (3)$$

where $V_{SP}$ is the voltage of the first input terminal $S_P$; and $V_{SN}$ is the voltage of the second input terminal $S_N$. $V_{DET}$ is the voltage of the rectifying terminal DET. $V_{TH}$ is the voltage of the threshold voltage $V_{TH}$ above-mentioned; $V_{215}$ is the value of the offset voltage 215; and $V_{225}$ is the value of the offset voltage 225.

The voltage of the rectifying terminal DET will be lower than the voltage of the threshold $V_{TH}$ once the diode 450 is conducted. It shows the power transistor 400 can only be turned on after the diode is turned on.

Figure 4:
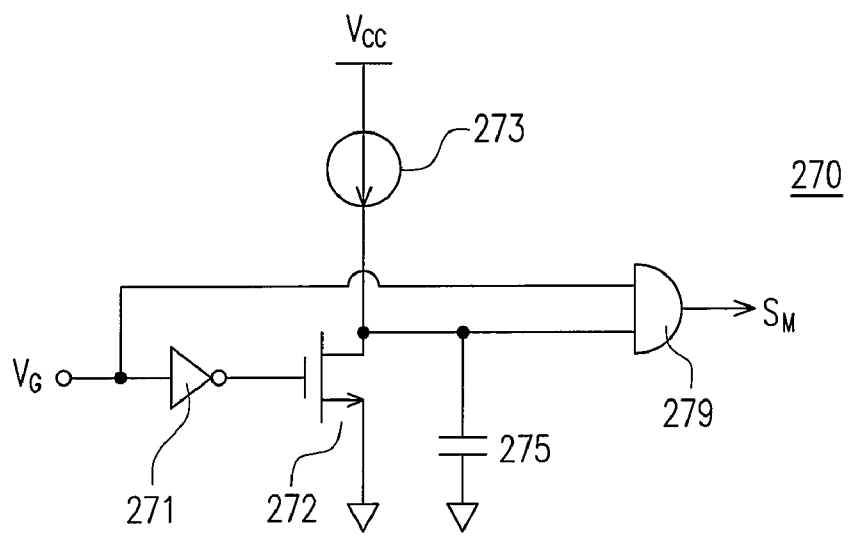
FIG. 4 is a maximum on time (MOT) circuit according to an embodiment of the present invention.

FIG. 4 is a schematic diagram of an embodiment of the maxinum-on-time circuit 270. A current source 273 is connected to charge a capacitor 275. A transistor 272 is connected to discharge the capacitor 275. The gate-drive signal $V_G$ is coupled to control the transistor 272 through an inverter 271. The gate-drive signal $V_G$ is further connected to an AND gate 279. Another input of the AND gate 279 is coupled to the capacitor 275. Once the gate-drive signal $V_G$ is enabled, the output of the AND gate 279 will generate the maximum-on-time signal $S_M$ to disable the gate-drive signal $V_G$ after the blanking time. The blanking time is determined by the current of the current source 273 and the capacitance of the capacitor 275.

Figure 5:
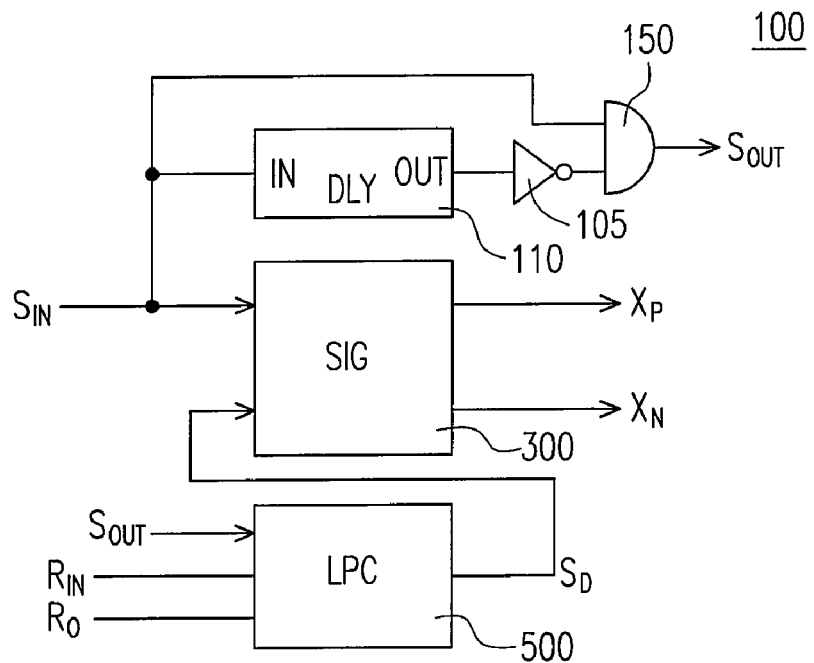
FIG. 5 is a block schematic of a pulse-signal generation circuit according to an embodiment of the present invention.

FIG. 5 is a schematic diagram of an embodiment of the block schematic of the pulse-signal generation circuit 100, as shown in FIG. 1. The drive signal $S_{OUT}$ is generated in response to the switching signal $S_{IN}$. The switching signal $S_{IN}$ is connected to the input of a delay circuit (DLY) 110. The output of the delay circuit 110 is connected the input of an AND gate 150 through an inverter 105. Another input of the AND gate 150 is coupled to the switching signal $S_{IN}$. The output of the AND gate 150 generates the drive signal Sour which is coupled to switch the transformer 10. A time delay is thus developed between the enable of the switching signal $S_{IN}$ and the enable of the drive signal $S_{OUT}$. The pulse-signal generation circuit 100 further includes an input voltage terminal RIN coupled to receive an input voltage signal representative to an input voltage $V_{IN}$ of the transformer 10. A program terminal $R_O$ is coupled to generate a program signal stands for the output voltage information of the power converter. The program signal, the input voltage signal and the drive signal $S_{OUT}$ are coupled to a linear-predict circuit ("LPC" as shown) 500. The linear-predict circuit 500 will generate a discontinuous-mode signal $S_D$ to turn off the power transistor in accordance with the input voltage signal, the program signal and the pulse width of the switching signal $S_{IN}$. Both the discontinuous-mode signal $S_D$ and the switching signal $S_{IN}$ are coupled to the signal generation circuit ("SIG" as shown) 300 to generate the pulse signal on the first output terminal $X_P$ and the second output terminal $X_N$.

Figure 6:
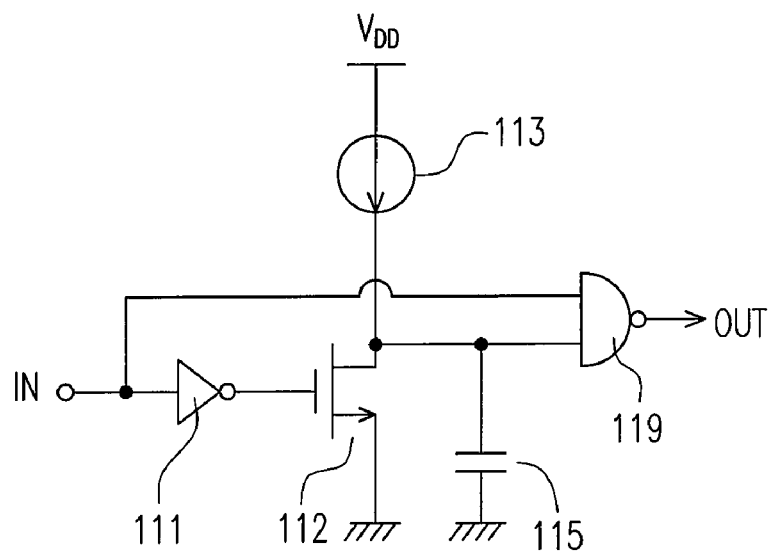
FIG. 6 shows the circuit schematic of a delay circuit.

FIG. 6 shows a schematic diagram of an embodiment of the circuit schematic of a delay circuit as mentioned. A current source 113 is connected to charge a capacitor 115. A transistor 112 is connected to discharge the capacitor 115. An input signal IN is coupled to control the transistor 112 through an inverter 111. The input signal IN is further connected to an NAND gate 119. Another input of the NAND gate 119 is coupled to the capacitor 115. The output of the NAND gate 119 is the output OUT of the delay circuit. When the input signal IN is in a logic-low status, the capacitor 115 is discharged and the output of the NAND gate 119 is in the status of the logic-high. When the input signal IN is changed to a logic-high status, the current source 113 will start to charge the capacitor 115. The output OUT of the NAND gate 119 will be in the logic-low status once the voltage of the capacitor 115 is higher than the input threshold of the NAND gate 119. The current of the current source 113 and the capacitance of the capacitor 115 determine the delay time $T_P$ of the delay circuit. The delay time $T_P$ is started from the logic-high status of the input signal to the logic-low status of the output signal of the delay circuit.

Figure 7:
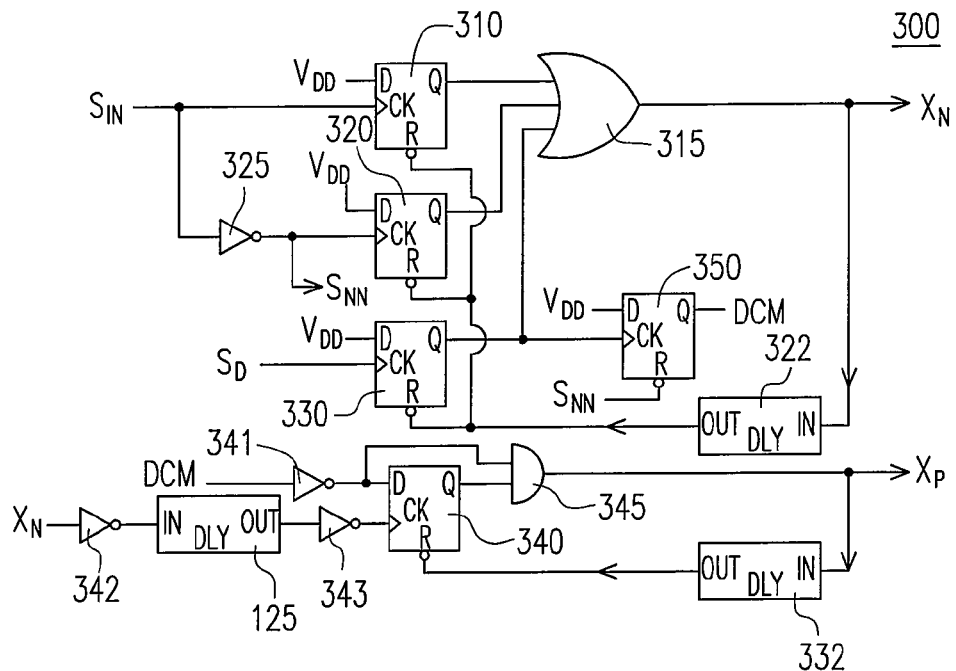
FIG. 7 is an embodiment of a signal generation circuit according to the present invention.

FIG. 7 is a schematic diagram of an embodiment of the circuit of the signal generation circuit 300. The clock-input CK of a flip-flop 310 is coupled to receive the switching signal $S_{IN}$ and generates a first signal connected to the first-input of an OR gate 315. The switching signal $S_{IN}$ further generates a signal $S_{NN}$ through an inverter 325. The signal $S_{NN}$ is connected to drive the clock-input of a flip-flop 320. The flip-flop 320 outputs a second signal connected to the second-input of the OR gate 315. The clock-input of a flip-flop 330 is coupled to receive the discontinuous-mode signal $S_D$ and generates a third signal at the output of the flip-flop 330. The third signal is connected to the third-input of an OR gate 315. The OR gate 315 is utilized to generate a negative-pulse signal at the second output terminal $X_N$ for turning off the integrated synchronous rectifier 51 and 52, as shown in FIG. 1. The negative-pulse signal is coupled to reset flip-flops 310, 320 and 330 through a delay circuit 322. The delay time of the delay circuit 322 determines the pulse width of the negative-pulse signal. The third signal is further coupled to the clock-input of a flip-flop 350 to generate a signal DCM at the output of the flip-flop 350. The signal DCM is coupled to the D-input of a flip-flop 340 and the input of an AND gate 345. Through an inverter 343, a delay circuit 125 and another inverter 342, the clock-input of the flip-flop 340 is coupled to the second output terminal XN to receive the negative-pulse signal. The output of the flip-flop 345 is connected to another input of the AND gate 345. The AND gate 345 is utilized to generate a positive-pulse signal at the first output terminal XP. The positive-pulse signal is coupled to reset the flip-flop 340 via a delay circuit 332. The delay time of the delay circuit 332 determines the pulse width of the positive-pulse signal. The pulse signal is therefore developed by the positive-pulse signal and the negative-pulse signal on the first output terminal XP and the second output terminal XN.

Figure 8:
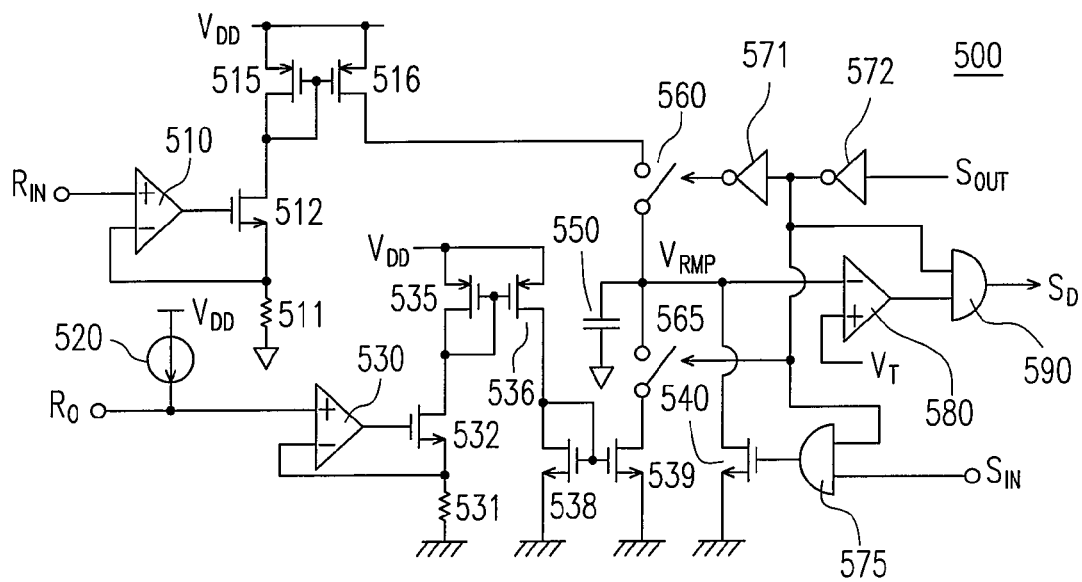
FIG. 8 is an embodiment of a linear-predict circuit according to the present invention.

FIG. 8 is a schematic diagram of an embodiment of the linear-predict circuit 500. An operational amplifier 510, transistors 512, 515, 516 and a resistor 511 develop a voltage-to-current converter. The operational amplifier 510 is coupled to the input voltage terminal $R_{IN}$ to receive the input voltage signal for generating a charge-current at the transistor 516. A current source 520 is coupled to the program terminal $R_O$ to generate the program signal associated with the resistor 80 of FIG. 1. An operational amplifier 530, a resistor 531 and transistors 532, 535, 536, 538, 539 develop another voltage-to-current converter. The operational amplifier 530 is coupled to the program terminal $R_O$ to receive the program signal for generating a discharge-current at the transistor 539. The charge-current is coupled to charge a capacitor 550 via a switch 560. The discharge-current is coupled to discharge the capacitor 550 through a switch 565. An inverter 572 is coupled to the output terminal SOUT to receive the drive signal $S_{OUT}$ for producing a discharge signal. The discharge signal is connected to control the switch 565. The discharge signal is further connected to an inverter 571 to generate a charge signal for controlling the switch 560. A ramp signal $V_{RMP}$ is generated at the capacitor 550. The positive input of a comparator 580 comprises a threshold voltage $V_T$. The negative input of the comparator 580 is coupled to the ramp signal $V_{RMP}$. The output of the comparator 580 and the discharge signal are connected to an AND 590 to generate the discontinuous-mode signal $S_D$. Furthermore, the discharge signal and the switching signal $S_{IN}$ are coupled to reset the capacitor 550 through a transistor 540 and an AND gate 575. The discontinuous-mode signal $S_D$ is therefore generated in response to the input voltage signal, the program signal and the pulse width of the switching signal $S_{IN}$.

When the power converter operated in the boundary mode, the magnetized flux $\Phi_C$ of the inductor is equal to the demagnetized flux $\Phi_D$. The boundary mode means the power converter is operated between the continuous mode and the discontinuous mode.

The equality is shown as, $$\Phi_C = \Phi_D \tag{4}$$

$$\Phi = B \times Ae = \frac{V \times T}{N} \tag{5}$$

$$\left[\left(\frac{V_{IN} \times N_S}{N_P}\right) - V_O\right] \times T_{CHARGE} = V_O \times T_{DISCHARGE} \tag{6}$$

$$T_{DISCHARGE} = \left\{\left[\left(\frac{V_{IN} \times N_S}{N_P}\right) - V_O\right] \Big/ V_O\right\} \times T_{CHARGE} \tag{7}$$

where B is the flux density; Ae is the cross-section area of the inductor 61 and 62; the magnetized time ($T_{CHARGE}$) is the pulse width of the switching signal $S_{IN}$; the demagnetized time ($T_{DISCHARGE}$) of the inductor 61 and 62 shows the boundary condition of the power converter.

The demagnetized time $T_{DISCHARGE}$ of the inductor 61 and 62 can be obtained in accordance with equation (7). It also shows the demagnetized time $T_{DISCHARGE}$ can be predicted in accordance with the input voltage $V_{IN}$, the output voltage $V_O$ and the magnetized time $T_{CHARGE}$ (the pulse width of the switching signal $S_{IN}$). The discontinuous-mode signal $S_D$ is generated in response to the demagnetized time $T_{DISCHARGE}$.

Figure 9A:
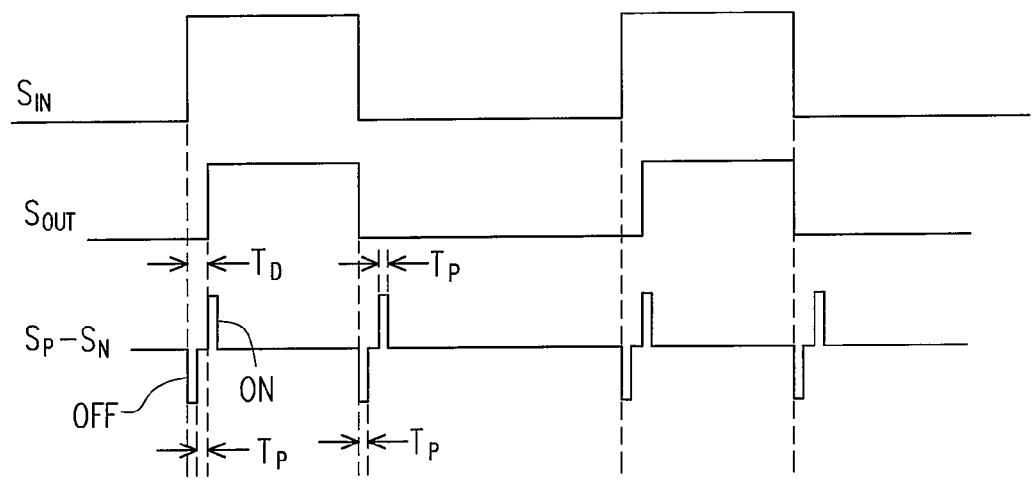
FIGS. 9A and 9B show key waveforms of the synchronous rectifying circuit according to an embodiment of the present invention.
Figure 9B:
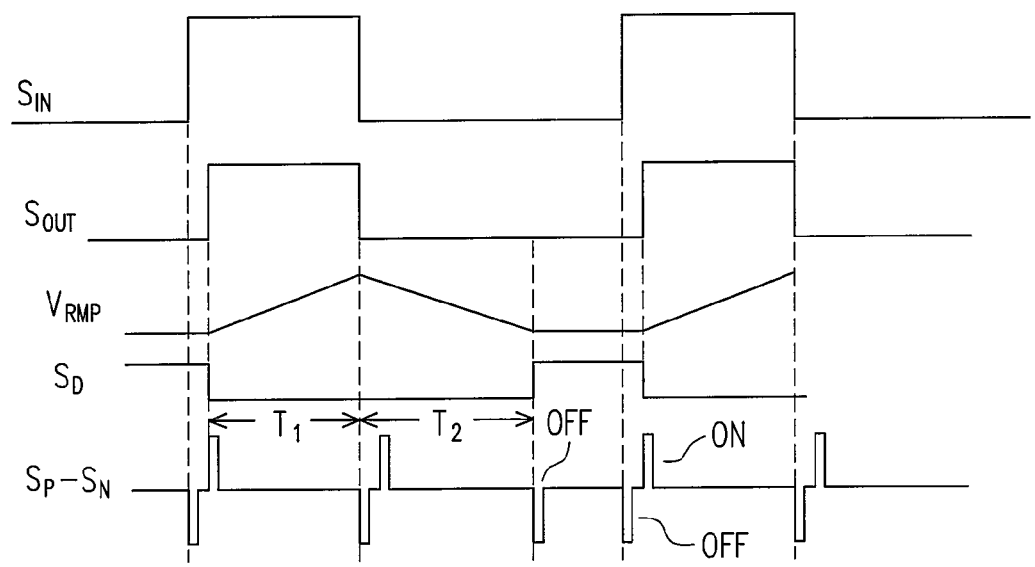

FIGS. 9A and 9B show key waveforms of the synchronous rectifying circuit. FIG. 9A shows a pulse signal $S_P$-$S_N$ (negative pulse signal) is generated in response to the leading edge and the trailing edge of the switching signal $S_{IN}$ to disable the integrated synchronous rectifier 51 and 52. Following the end of the negative pulse signal, a pulse signal $S_P$-$S_N$ (positive pulse signal) is generated to enable integrated synchronous rectifier 51 or 52 if the diode of the integrated synchronous rectifier 51 or 52 is conducted. FIG. 9B shows the waveform of the ramp signal $V_{RMP}$. The discontinuous-mode signal $S_D$ and the additional pulse signal $S_P$-$S_N$ (negative pulse signal) are generated at the end of the discharge time of the ramp signal $V_{RMP}$. It means the integrated synchronous rectifier 51 and 52 will be disabled when the inductor 61 and 62 are fully demagnetized (discontinuous mode).

Figure 10:
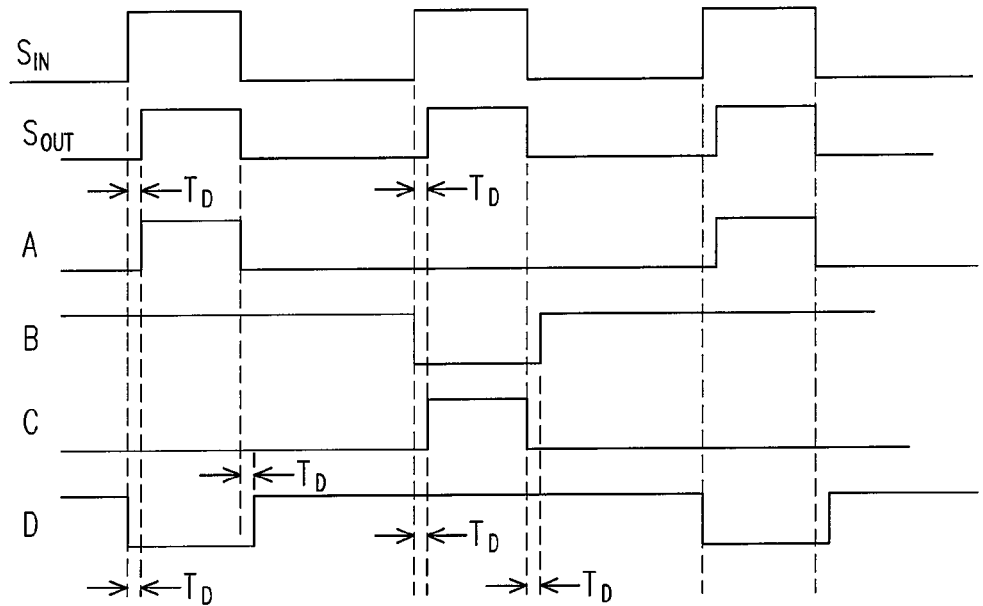
FIG. 10 shows switching waveforms of a full-bridge phase shift power converter.
Figure 11:
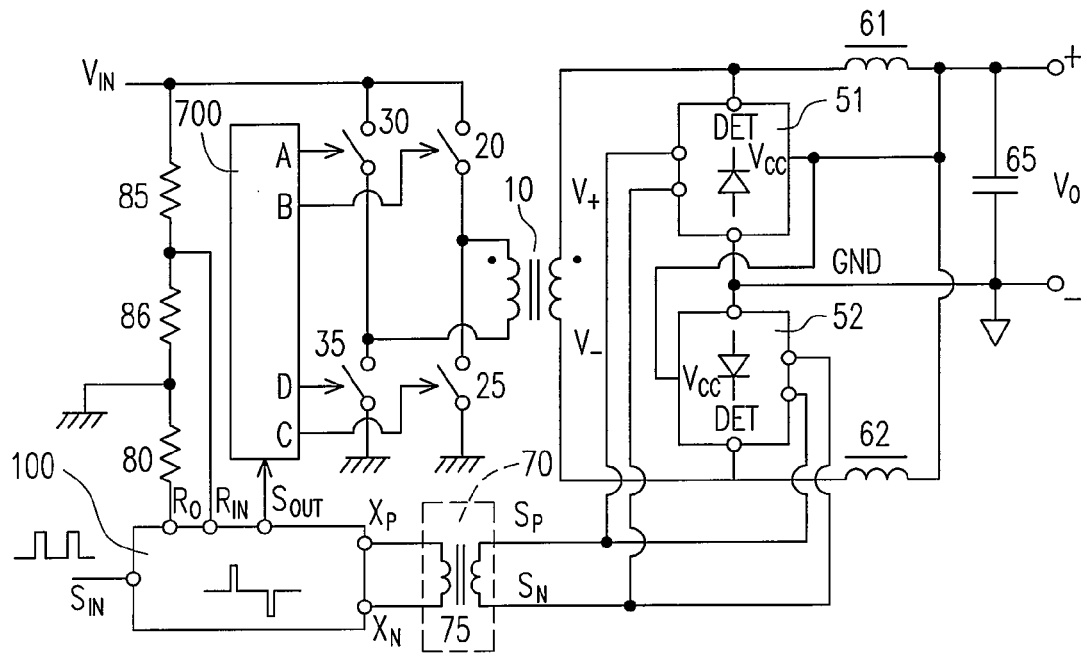
FIG. 11 shows another embodiment of the circuit schematic of a power converter with synchronous rectifier in which a pulse transformer is operated as the isolation device according to the present invention.

FIG. 10 show switching waveforms of the full-bridge drive circuit 700. Phase shift drive signals A, B, C, and D are generated in response to the drive signal $S_{OUT}$ to control the power switch 30, 20, 25 and 35 respectively. The time delay $T_D$ between the phase shift driver signal A, B, C, and D are used for the phase shift for achieving the soft switching. FIG. 11 shows a pulse transformer 75 that is used as the isolation device 70 for synchronous rectifying circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifying circuit for power converter, comprising:
    an integrated synchronous rectifier comprising:
        a rectifying terminal, coupled to a secondary side of a transformer;
        a ground terminal, coupled to an output of the power converter;
        a first input terminal; and
        a second input terminal;
    wherein a power transistor is connected between the rectifying terminal and the ground terminal; and the first input terminal and the second input terminal are coupled to receive two pulse signals for turning on/off the power transistor;
    a pulse-signal generation circuit comprising:
        an input terminal, coupled to receive a switching signal;
        a first output terminal; and
        a second output terminal;
    wherein the switching signal is used for switching the transformer of the power converter; and the first output terminal and the second output terminal are utilized to generate the pulse signals; and
    an isolation device, coupled between the first input terminal and the second input terminal, and the first output terminal and the second output terminal.

2. The synchronous rectifying circuit as claimed in claim 1, wherein the pulse-signal generation circuit further comprises:
    an input voltage terminal, coupled to receive an input voltage signal representing an input voltage of the transformer; and
    a program terminal, coupled to generate a program signal, wherein the pulse-signal generation circuit produces an additional pulse signal to turn off the power transistor in accordance with the input voltage signal, the program signal and a pulse width of the switching signal.

3. The synchronous rectifying circuit as claimed in claim 1, wherein the isolation device comprises a pulse transformer or a plurality of capacitors.

4. The synchronous rectifying circuit as claimed in claim 1, wherein the pulse signals are differential signals; and the polarity of the pulse signals determines the on/off of the power transistor.

5. The synchronous rectifying circuit as claimed in claim 1, wherein each of the pulse signals is a trig signal, and a pulse width of each of the pulse signals is shorter than the pulse width of the switching signal.

6. The synchronous rectifying circuit as claimed in claim 1, wherein the integrated synchronous rectifier comprises a latch circuit coupled to the first input terminal and the second input terminal to receive the pulse signals for setting or resetting the latch circuit; wherein the latch circuit is coupled to turn on/off the power transistor.

7. The synchronous rectifying circuit as claimed in claim 1, wherein the integrated synchronous rectifier further comprises a maximum-on-time circuit to limit a maximum on time of the power transistor.

8. A synchronous rectifier apparatus for power converter, comprising:
    a pulse-signal generation circuit, receiving a switching signal for generating two pulse signals in response to the leading edge and the trailing edge of the switching signal;
    an isolation device, coupled to transfer the pulse signals through an isolation barrier of the transformer; and
    an integrated synchronous rectifier, having a power transistor and a control circuit; wherein the power transistor is coupled to the transformer for the rectifying; the control circuit is operated to receive the pulse signals for turning on/off the power transistor; and
    wherein the switching signal is used for switching the transformer of the power converter; and the pulse signals are coupled to set or reset a latch circuit of the control circuit for controlling the power transistor.

9. The synchronous rectifier apparatus as claimed in claim 8, wherein the pulse-signal generation circuit comprises:
    an input voltage terminal, coupled to receive an input voltage signal representing an input voltage of the transformer; and
    a program terminal, coupled to receive a program signal;
    wherein the pulse signals are generated to turn off the power transistor in accordance with the input voltage signal, the program signal and the pulse width of the switching signal.

10. The synchronous rectifier apparatus as claimed in claim 8, further comprising a diode coupled to the power transistor in parallel; and the power transistor is turned on by the pulse signals once the diode is conducted.

11. The synchronous rectifier apparatus as claimed in claim 8, wherein the isolation device comprises a plurality of capacitors or a pulse transformer.

12. The synchronous rectifier apparatus as claimed in claim 8, wherein each of the pulse signals is a trig signal, and a pulse width of each of the pulse signals is shorter than a pulse width of the switching signal.

13. The synchronous rectifier apparatus as claimed in claim 8, wherein the pulse-signal generation circuit further comprises:
    an input signal terminal, coupled to receive the switching signal;
    a first output terminal; and
    a second output terminal;

wherein the pulse signals are generated at the first output terminal and the second output terminal.

14. The synchronous rectifier apparatus as claimed in claim 8, wherein the integrated synchronous rectifier comprises:
    a rectifying terminal, coupled to a secondary side of the transformer;
    a ground terminal, coupled to an output of the power converter;
    a first input terminal; and
    a second input terminal;
    wherein the power transistor is connected between the rectifying terminal and the ground terminal; and the first input terminal and the second input terminal are coupled to receive the pulse signals for turning on/off the power transistor.

15. The synchronous rectifier apparatus as claimed in claim 8, wherein the maximum on time of the power transistor is limited by a maximum-on-time circuit.

16. A method for improving efficiency of a power converter, comprising:
    receiving a switching signal by a pulse-signal generation circuit;
    generating two pulse signals in response to the leading edge and the trailing edge of the switching signal by the pulse-signal generation circuit;
    transferring the pulse signals from a primary side of a transformer to a secondary side of the transformer through an isolation barrier;
    setting or resetting a latch in response to the pulse signals; and
    turning on/off a power transistor in accordance with a status of the latch;
    wherein the switching signal is used for switching the transformer of the power converter; and the power transistor is coupled to the secondary side of the transformer for the rectifying.

17. The method for improving efficiency of a power converter as claimed in claim 16, further comprising:
    receiving an input voltage signal representing an input voltage of the transformer;
    receiving a program signal;
    wherein the pulse signals are generated to turn off the power transistor in accordance with the input voltage signal, the program signal and a pulse width of the switching signal.

18. The method for improving efficiency of a power converter as claimed in claim 16, wherein the latch can be enabled to turn on the power transistor only when a diode is conducted, and wherein the diode is coupled to the power transistor in parallel.

19. The method for improving efficiency of a power converter as claimed in claim 16, wherein the isolation device comprises a pulse transformer or a plurality of capacitors.

20. The method for improving efficiency of a power converter as claimed in claim 16, wherein the pulse width of each of the pulse signals is shorter than a pulse width of the switching signal.

21. The method for improving efficiency of a power converter as claimed in claim 16, wherein a maximum on time of the power transistor is limited by a maximum-on-time circuit.

22. A synchronous rectifying circuit for power converter, comprising:
    a first integrated synchronous rectifier coupled to a first terminal of a secondary side of a transformer;
    a second integrated synchronous rectifier coupled to a second terminal of the secondary side of the transformer;
    wherein the integrated synchronous rectifier comprises:
        a rectifying terminal coupled to the transformer, a ground terminal coupled to the output of the power converter and a power transistor connected between the rectifying terminal and the ground terminal;
        a first input terminal and a second input terminal; wherein the first input terminal and the second input terminal are coupled to receive two pulse signals for controlling the power transistor;
    a pulse-signal generation circuit comprising:
        an input terminal coupled to receive a switching signal; wherein the switching signal is used for switching the transformer of the power converter;
        a first output terminal and a second output terminal for generating the pulse signals separately; and
    an isolation device coupled between the first input terminal and the second input terminal, and the first output terminal and the second output terminal.

23. The synchronous rectifying circuit as claimed in claim 22, wherein the pulse-signal generation circuit further comprises:
    an input voltage terminal coupled to receive an input voltage signal representing an input voltage of the transformer; and
    a program terminal coupled to generate a program signal;
    wherein the pulse-signal generation circuit produces an additional pulse signal to turn off the power transistor in accordance with the input voltage signal, the program signal and a pulse width of the switching signal.

24. The synchronous rectifying circuit as claimed in claim 22, wherein the pulse signals are two differential signals; a pulse width of each of the pulse signals is shorter than the pulse width of the switching signal; and polarities of the pulse signals determine on/off of the power transistor.

25. The synchronous rectifying circuit as claimed in claim 22, wherein the integrated synchronous rectifier comprises a latch circuit coupled to the first input terminal and the second input terminal to receive the pulse signals for setting or resetting the latch circuit; wherein the latch circuit is coupled to turn on/off the power transistor.

* * * * *